United States Patent [19]
Zopfi

[11] 4,243,010
[45] Jan. 6, 1981

[54] SUPERCHARGER APPARATUS WITH FIXED BAFFLE AIR-FUEL MIXTURE ROUTING BOX

[76] Inventor: Robert A. Zopfi, 4301 S.E. Fieldcrest, Milwaukie, Oreg. 97222

[21] Appl. No.: 6,367

[22] Filed: Jan. 25, 1979

[51] Int. Cl.³ ............................................. F02B 33/44
[52] U.S. Cl. .................................................. 123/559
[58] Field of Search ............... 123/119 C; 60/605, 611

[56] References Cited

U.S. PATENT DOCUMENTS

| | | | |
|---|---|---|---|
| 1,765,278 | 6/1930 | Lavergne | 123/119 C |
| 2,839,038 | 6/1958 | Middlebrooks | 123/119 C |
| 3,324,651 | 6/1967 | Smith et al. | 123/119 C X |
| 3,868,822 | 3/1975 | Keller | 60/611 X |

*Primary Examiner*—Michael Koczo

*Attorney, Agent, or Firm*—Klarquist, Sparkman, Campbell, Leigh, Hall & Whinston

[57] ABSTRACT

A compact air-fuel mixture routing box mounted on an internal combustion engine is divided into first and second chambers by an internal diagonally positioned opening free fixed baffle. An air-fuel mixture from a carburetor mounted on top of the routing box passes downwardly through a top panel of the box and into the first chamber, along one side of the baffle, and outwardly through one side wall of the routing box to an inlet of a supercharger. The pressurized mixture from the supercharger enters the second chamber through another side wall of the box, passes downwardly along the opposite side of the baffle, and out through a bottom panel of the routing box to the intake manifold of an engine. A spring biased pressure relief valve limits the pressure of the air-fuel mixture fed to the engine.

6 Claims, 4 Drawing Figures

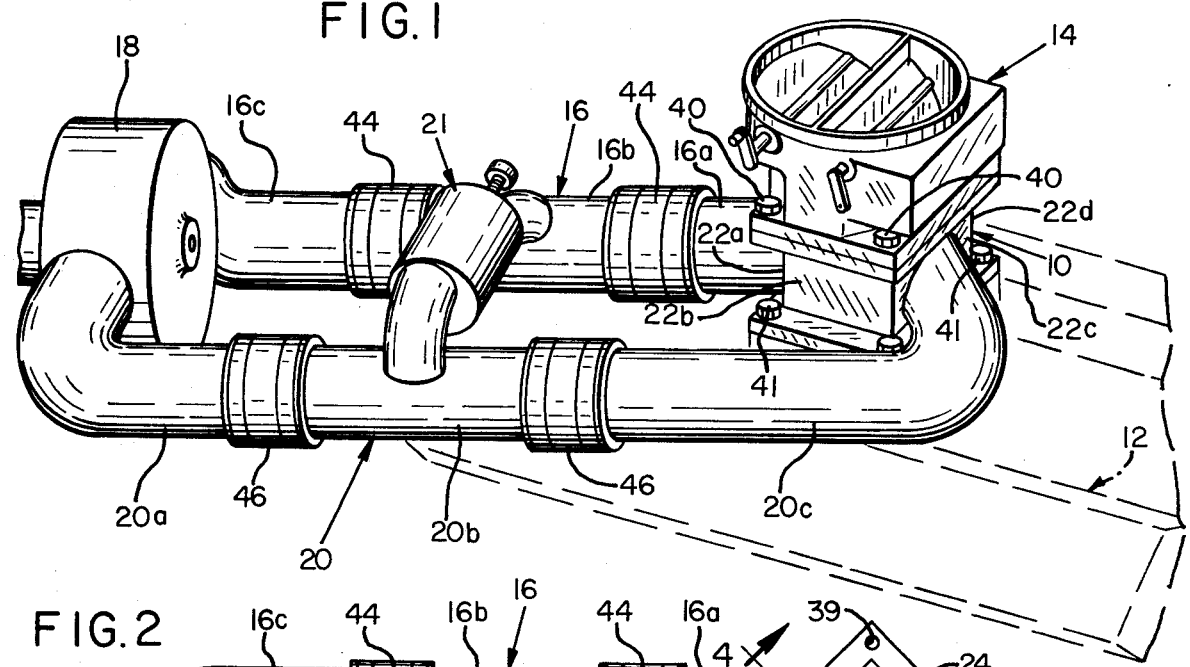
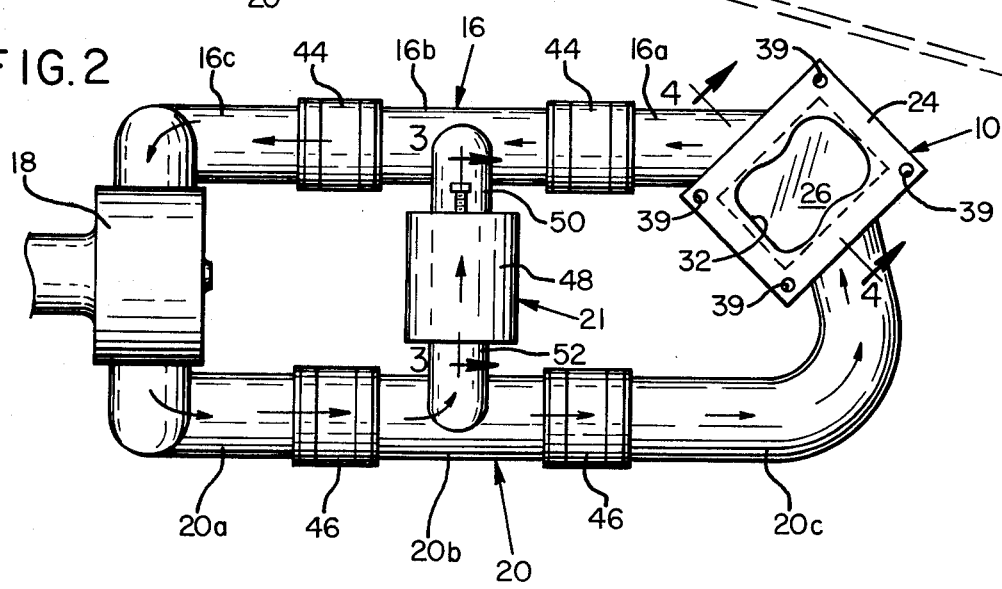
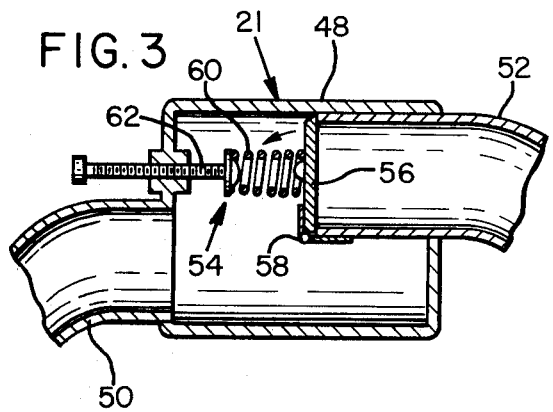
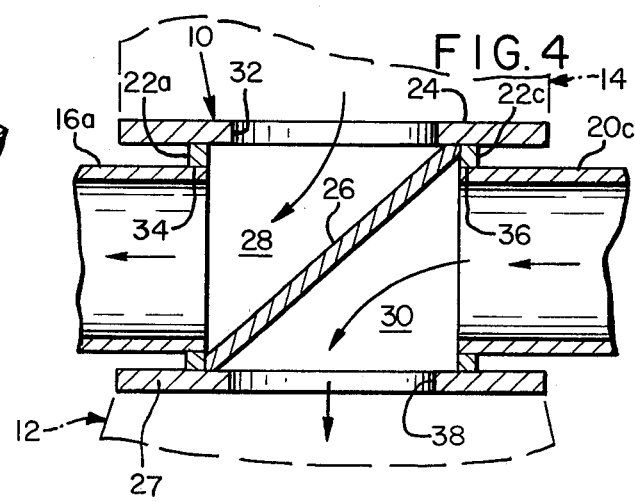

SUPERCHARGER APPARATUS WITH FIXED BAFFLE AIR-FUEL MIXTURE ROUTING BOX

BACKGROUND OF THE INVENTION

1. Field of the Invention

This invention relates to supercharger devices for pressurizing an air-fuel mixture from a carburetor and feeding the pressurized mixture to an internal combustion engine.

2. Description of the Prior Art

It is well known in the art to pressurize the fuel induction system of an internal combustion engine so that the air-fuel mixture from the system is applied to the combustion chamber of the engine under increased pressure.

One common method of pressurizing the mixture is through the use of a compressor or supercharger. Such a compressor is generally of a centrifical type and is commonly wholly or partially driven by a turbine powered by engine exhaust gases.

One common drawback of known supercharger devices is their use of relatively bulky conduit devices for directing an air-fuel mixture from a carburetor through a compressor and to an engine. This makes such devices difficult to fit within the narrow confines available under the hood of a car or other vehicle.

Also, known prior art supercharger devices often utilize air-fuel mixture routing devices having internal moving parts which are subject to jamming and are not easily accessible for repair in the event of malfunction. U.S. Pat. No. 3,868,822 of Keller is typical of such devices.

Another frequent drawback of known supercharger devices in their use of compenents having complex structural configurations making them difficult to manufacture.

In view of the foregoing, a need exists for a compact, mechanically simple supercharger device with a minimum of moving parts.

SUMMARY OF THE INVENTION

It is a primary object of the invention to provide an improved supercharger device with a compact air-fuel mixture routing box mounted between a carburetor and an engine.

It is another object of the invention to provide a supercharger device having an air-fuel mixture routing box which smoothly directs the mixture from a carburetor to a compressor and then to the intake manifold of an engine.

It is a further object of the invention to provide a supercharger device with a minimum of moving parts.

Still another object of the invention is to provide a relatively maintenance free and mechanically simple air-fuel mixture routing box for a supercharger device.

Another object of the invention is to provide an easily manufacturable relatively low cost air-fuel mixture routing box for a supercharger device.

An additional object of the invention is to provide a supercharger device which limits the pressure of the air-fuel mixture applied to the intake manifold of the engine to a predetermined and adjustable maximum level.

BRIEF DESCRIPTION OF THE DRAWINGS

In the Drawings:

FIG. 1 is a perspective view of a supercharger device in accordance with the invention;

FIG. 2 is a top plan view of a portion of the supercharger device of FIG. 1;

FIG. 3 is a sectional view of a bypass valve assembly of the supercharger device taken along lines 3—3 of FIG. 2; and FIG. 4 is a cross-sectional view of the air-fuel mixture routing box of FIG. 1 taken along lines 4—4 of FIG. 2.

DETAILED DESCRIPTION OF THE PREFERRED EMBODIMENT

With reference to FIG. 1, the present invention comprises a supercharger device including an air-fuel mixture routing box 10 mounted on top of an automobile engine 12 and supporting a fuel injection system such as a carburetor 14. The air-fuel mixture created within carburetor 14 passes through box 10 and a low pressure conduit 16 to an inlet of a supercharger or compressor 18. Supercharger 18 is driven in a well known manner, such as by a turbine powered by exhaust gases from engine 12, to increase the pressure of the air-fuel mixture. A high pressure conduit 20 carries the pressurized mixture from an outlet of supercharger 18 to mixture routing box 10 which in turn directs it downwardly into the intake manifold of engine 12. A pressure relief assembly 21 shunts conduit 20 to conduit 16 in the event the pressure differential between these conduits, and hence the pressure of the mixture entering the enginge, exceeds a predetermined level.

Referring to FIGS. 1 and 4, routing box 10 comprises four rectangular and vertical side wall plates 22a, 22b, 22c and 22d connected edge to edge to form a box of rectangular cross-section with side wall 22a parallel to side wall 22c and side wall 22b parallel to side wall 22d. An upper horizontal plate or panel 24 is secured to the upper ends of these side wall plates and provides a base for supporting carburetor 14. A similar horizontal lower plate or panel 26 is secured to the lower ends of these side wall plates and provides a flat lower supporting surface for mounting routing box 10 to engine 12.

A fixed, opening free baffle is rigidly mounted diagonally within routing box 10 and extends from the intersection of plate 22a and 27 to the intersection of plates 22c and 24. Baffle 26 thus divides the hollow cubic interior or routing box 10 into two equally dimensioned chambers 28, 30 of triangular cross-section as viewed in FIG. 4.

An end portion of a conduit section 16a of conduit 16 is inserted into an opening through plate 22a bounded by an annular wall 34 and is rigidly secured in place, as by welding. Similarly, an end portion of a conduit section 20c of conduit 20 is inserted into an opening through plate 22c bounded by an annular wall 36 and secured in place.

Carburetor 14 communicates with chamber 28 through an opening 32 in top panel 24. At the same time, chamber 30 communicates with the intake manifold of engine 12 through an opening 38 in bottom panel 26. Thus, an unobstructed air-fuel mixture flow passgeway is provided through plate 24, chamber 28 and conduit 16 to compressor 18. Another unobstructed passageway is also provided from compressor 18 through conduit 20, chamber 30 and plate 26 to engine 12.

Both plates 24 and 26 have peripheral mounting flange portions extending outwardly beyond the outer edges of respective side plates 22. Bores, such as 39 shown in FIG. 2, are provided for mounting purposes.

That is, carburetor 14 is secured to routing box 10 by bolts 40 passing through bores 39 and corresponding bores through a carburetor mounting flange. In a like manner, bolts 41 secure the routing box to engine 12.

Referring next to FIGS. 2 and 3, bypass passageway assembly 22 includes a first conduit section 16b releasably secured at one end by coupling 44 to the free end of conduit section 16a and also at its other end to the free end of a conduit section 16c which is secured at its other end to the low pressure inlet of compressor 18. Assembly 22 also includes a second conduit section 20b releasably secured at one end by couplings 46 to the free end of conduit section 20c and at its other end to the free end of a conduit section 20a which is secured at its other end to the high pressure outlet of compressor 18. By releasing couplings 44 and 46, the bypass assembly can be removed quickly from the supercharger device. In addition, bypass passageway assembly 22 includes a hollow main bypass chamber 48 coupled by conduits 50 and 52 to respective conduit sections 16b and 20b. A valve assembly 54 within chamber 48 is normally closed to block the passage of any of the air-fuel mixture from conduit 20 through the bypass assembly to conduit 16. Valve assembly 54 includes a valve 56 hinged at 58 to an end portion of conduit 52 which extends within chamber 48. Valve 56 seats on this end portion when the valve assembly is closed and thereby prevents passage of the air-fuel mixture through chamber 48. A spring 60 connected at one end to the valve and at its other end to a threaded adjustment screw 62 normally biases valve 56 in its closed position.

Screw 62 is threadably supported by an end wall of chamber 48 above conduit 50. Clockwise rotation of screw 62 in FIG. 3 compresses spring 60 and thereby increases the force applied by the spring to valve 56. Conversely, counterclockwise rotation of screw 62 relaxes spring 60 and reduces the force applied to valve 56. Thus, the pressure differential across valve 56 needed to open this valve is adjustable. In one preferred embodiment, spring 62 is adjusted so that the valve opens when the pressure differential across it exceeds eight pounds per square inch.

The use of a diagonal fixed baffle 26 in the routing box 14 enables the air-fuel mixture to enter the top of the routing box from the carburetor 14 and exit through one side of the routing box to compressor 18. In addition, air from the compressor enters the routing box through another of its sides and exits downwardly through the bottom of the routing box to the engine. Thus, the use of a diagonal fixed baffle reduces the overall height of the air routing box to substantially no more than the diameter of one of the conduits 16 or 20. As a more specific example of the compact size of my device, a routing box having inside dimensions of 2-5/16 inches high by $5\frac{1}{2}$ inches long by $2\frac{7}{8}$ inches wide has been found suitable for use in one of my supercharger devices designed for a 1962 International pickup truck.

OPERATION

When installed, the air-fuel mixture from carburetor 14 passes downwardly through the opening in panel 24 and into chamber 28. The upper surface of the angled baffle plate 26 deflects the mixture 90° so that it passes outwardly through plate 22 and into conduit 16 and from thence to compressor 18. Conduit 20 carries the pressurized mixture from compressor 18 through plate 22c and into chamber 30. Within chamber 30, the mixture is deflected 90° by the lower surface of plate 26 to flow downwardly through plate 26 to engine 12.

The angled baffle plate provides a relatively smooth change in direction of the air-fuel mixture within routing box 10.

In the event the pressurized mixture in conduit 20 exceeds the preselected maximum pressure established by bypass valve assembly 54, conduit 20 is shunted to conduit 16 to relieve the excess pressure.

Having illustrated and described the principles of my invention with reference to a preferred embodiment, it should be apparent to those persons skilled in the art that such invention may be modified in arrangement and detail without departing from such principles. I claim as my invention all such modifications as come within the true spirit and scope of the following claims.

1. An apparatus for directing an air-fuel mixture from a fuel mixture outlet port of a fuel induction device of an internal combustion engine to an inlet port of a supercharger, in which the mixture is pressurized, and the pressurized mixture from an outlet port of the supercharger to an intake inlet port of the intake manifold of the engine comprising:

an upright hollow air-fuel mixture routing box having an upper cover member, a lower base member, and first and second side members extending between said cover and base members;

said routing box also including an opening free internal fixed baffle member separating the interior of said routing box into first and second chambers, said baffle member extending between said cover and base members in a non-vertical plane;

said routing box defining a first opening through said cover member which communicates between the exterior of said routing box and said first chamber, a second opening through said base member which communicates between the exterior of said routing box and said second chamber, a third opening through said first side member which communicates between the exterior of said routing box and said first chamber and a fourth opening through said second side member which communicates between the exterior of said routing box and said second chamber;

said apparatus also including means for connecting the fuel mixture outlet port to said first opening, means for connecting the second opening to the intake inlet port, means for connecting the third opening to the supercharger inlet port and means for connecting the supercharger outlet port to the fourth opening such that an air-fuel mixture from the fuel mixture outlet port of the fuel induction device enters said first chamber through the first opening in said cover plate, flows along an upper surface of said baffle member and exits said first chamber through the third opening in said first side member to the supercharger inlet port, and such that the pressurized air-fuel mixture from the supercharger outlet port enters said second chamber through the fourth opening in said second side member, flows along a lower surface of said baffle member and exits from said second chamber through the second opening in said base member to the intake inlet port of the engine intake manifold.

2. An apparatus according to claim 1 in which said first and second side members comprise parallel spaced apart first and second side wall plates and said baffle member comprises a baffle plate extending diagonally between said first and second side wall plates.

3. An apparatus according to claim 2 in which said routing box includes parallel spaced apart third and fourth side wall plates extending between said cover and base members, said third side wall plate interconnecting respective end portions of said first and second plates and said fourth side wall plate interconnecting respective opposite end portions of said first and second plates such that together with said cover and base members said side wall plates enclose the hollow interior of said air routing box, said baffle plate extending on a diagonal between the intersection of said first plate and said base member and the intersection between said second plate and said cover member.

4. An apparatus for directing an air-fuel mixture from a fuel mixture outlet port of a fuel induction device of an internal combustion engine to an inlet port of a supercharger, in which the mixture is pressurized, and the pressurized mixture from an outlet port of the supercharger to an intake inlet port of the intake manifold of the engine comprising:
- a hollow upright rectilinear air-fuel mixture routing box having top, bottom and side panels;
- a fixed opening free baffle plate positioned internally within said routing box in a plane skewed from planes containing said top, base and side panels such that said baffle plate separates the interior of said routing box into first and second distinct chambers; and
- said routing box defining a first opening through said top panel which communicates between the exterior of said routing box and said first chamber, a second opening through said bottom panel which communicates between the exterior of said routing box and said second chamber, a third opening through one of said side panels which communicates between the exterior of said routing box and said first chamber and a fourth opening through another of said side panels opposite said one side panel which communicates between the exterior of said routing box and said second chamber;
- said apparatus also including means for connecting the fuel mixture outlet port to said first opening, means for connecting the second opening to the intake inlet port, means for connecting the third opening to the supercharger inlet port and means for connecting the supercharger outlet port to the fourth opening such that an air-fuel mixture from the fuel mixture outlet port of the fuel induction device enters said first chamber through the first opening in said top panel, is deflected by an upper surface of said baffle member to exit from said first chamber through the third opening in said one of said side panels to the supercharger inlet port, and such that the pressurized air-fuel mixture from the supercharger outlet port enters said second chamber through the fourth opening in said another of said side panels and is deflected by a lower surface of said baffle member to exit from said second chamber through the second opening in said base panel to the intake inlet port of the engine intake manifold.

5. An apparatus for directing an air-fuel mixture from a fuel induction device of an internal combustion engine to a supercharger, in which the mixture is pressurized, and the pressurized air-fuel mixture from the supercharger to the intake manifold of the engine comprising:
- an upright hollow air-fuel mixture routing box having a horizontal base plate adapted for connection to an upper surface of the engine, a horizontal cover plate adapted for supporting the fuel induction system and four vertical side wall plates each extending from said base plate to said cover plate, said side wall plates being connected edge to edge with first and second of said side wall plates parallel to and spaced apart from one another and third and fourth of said side wall plates parallel to and spaced apart from one another;
- a fixed rectangular opening free baffle plate positioned diagonally within said routing box with a lower edge portion connected to an interior surface of said routing box at the intersection of said first side wall plate and said base plate, the upper edge portion connected to an interior surface of said routing box at the intersection of said second side wall plate and said cover plate, one side edge portion connected to an interior surface of said third side wall plate and the other side edge portion connected to an interior surface portion of said fourth side wall plate; such that said baffle plate separates the interior of said air routing box into first and second chambers with said first chamber bounded at its sides by the interior surface of said first side wall plate, the lower surface of said baffle plate and the upper surface of said base plate;
- a low pressure conduit communicating from said first chamber through an opening in said first plate to a low pressure inlet of the supercharger;
- a high pressure conduit communicating from a high pressure outlet of the supercharger through an opening in said second plate to the second chamber;
- the first chamber communicating through an opening in said cover plate with the air-fuel mixture outlet of the fuel induction device and the second chamber communicating through an opening in said base plate with the intake manifold of the engine;
- such that the air-fuel mixture from the fuel induction device flows downwardly through the cover plate into the first chamber, along the upper surface of said baffle plate and outwardly through said first side wall plate, and such that the pressurized air-fuel mixture from the supercharger flows through said second side wall plate into the second chamber, along the lower surface of said baffle plate and through said base plate to the intake manifold of the engine; and
- a pressure relieving bypass assembly means connected between said high and low pressure conduits for directing at least a portion of the pressurized air-fuel mixture from said high pressure line to said low pressure line when the pressure in said high pressure line exceeds the pressure in said low pressure line by a preselected and adjustable amount.

6. An air-fuel mixture routing apparatus for receiving an air-fuel mixture delivered thereto from a fuel induction device of an internal combustion engine, discharging the air-fuel mixture for passage to a supercharger, in which the air-fuel mixture is pressurized, receiving the pressurized air-fuel mixture from the supercharger and discharging the pressurized air-fuel mixture for passage to the intake manifold of the internal combustion engine comprising:

UNITED STATES PATENT AND TRADEMARK OFFICE
CERTIFICATE OF CORRECTION

PATENT NO. : 4,243,010
DATED : January 6, 1981
INVENTOR(S) : ROBERT A. ZOPFI

It is certified that error appears in the above-identified patent and that said Letters Patent are hereby corrected as shown below:

Column 1, line 36, change --in-- to "is"

change --compenents-- to "components";

Column 2, line 29, change --enginge-- to "engine";

Column 2, line 46, change --or-- to "of";

Column 2, lines 60 & 61, change --passgeway-- to "passageway".

Signed and Sealed this

*Twenty-third* Day of *June 1981*

[SEAL]

*Attest:*

RENE D. TEGTMEYER

*Attesting Officer*　　*Acting Commissioner of Patents and Trademarks*